(12) United States Patent
Kamoshita

(10) Patent No.: US 7,435,446 B2
(45) Date of Patent: Oct. 14, 2008

(54) METHOD OF PRODUCING GAS BARRIER MULTILAYER BODY

(75) Inventor: Miyuki Kamoshita, Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 567 days.

(21) Appl. No.: 10/551,903

(22) PCT Filed: Apr. 9, 2004

(86) PCT No.: PCT/JP2004/005173

§ 371 (c)(1),
(2), (4) Date: Oct. 5, 2005

(87) PCT Pub. No.: WO2004/089625

PCT Pub. Date: Oct. 21, 2004

(65) Prior Publication Data

US 2006/0054263 A1  Mar. 16, 2006

(30) Foreign Application Priority Data

Apr. 9, 2003 (JP) .............................. 2003-105897
Aug. 8, 2003 (JP) .............................. 2003-289705

(51) Int. Cl.
*B05D 3/02* (2006.01)
*B05D 3/10* (2006.01)

(52) U.S. Cl. .................. 427/335; 427/336; 427/341; 427/343; 427/407.1; 427/412.1; 427/418; 427/419.1; 427/419.2; 427/419.5

(58) Field of Classification Search ................ 427/335, 427/336, 341, 343, 407.1, 418, 419.1, 419.2, 427/419.5
See application file for complete search history.

(56) References Cited

U.S. PATENT DOCUMENTS

| | | | |
|---|---|---|---|
| 5,552,479 A | 9/1996 | Tanaka et al. | |
| 5,560,988 A | 10/1996 | Oba et al. | |
| 5,574,096 A | 11/1996 | Tanaka et al. | |
| 6,022,913 A | 2/2000 | Tanaka et al. | |
| 6,143,384 A | 11/2000 | Tanaka et al. | |
| 6,605,344 B1 | 8/2003 | Ohba et al. | |
| 6,709,735 B2 * | 3/2004 | Posey et al. | 428/215 |
| 7,109,272 B2 | 9/2006 | Ikeda et al. | |
| 7,157,147 B2 * | 1/2007 | Inui et al. | 428/451 |
| 2002/0048641 A1 | 4/2002 | Hidaka et al. | |

FOREIGN PATENT DOCUMENTS

| | | |
|---|---|---|
| EP | 1548074 | 6/2005 |
| JP | 06-220221 | 8/1994 |
| JP | 07-102083 | 4/1995 |
| JP | 07-205379 | 8/1995 |
| JP | 07-266441 | 10/1995 |
| JP | 08-041218 | 2/1996 |
| JP | 10-237180 | 9/1998 |
| JP | 11-034246 | 2/1999 |
| JP | 2000-000931 | 1/2000 |
| JP | 2001-049069 | 2/2001 |
| JP | 2001-301764 | 10/2001 |
| JP | 2001-323204 | 11/2001 |
| JP | 2001-335736 | 12/2001 |
| JP | 2002-020677 | 1/2002 |
| JP | 2002-225202 | 8/2002 |
| JP | 2002-241671 | 8/2002 |
| JP | 2002-338771 | 11/2002 |
| JP | 2003-49035 | 2/2003 |
| JP | 2004-35832 | 2/2004 |
| JP | 2004-136281 | 5/2004 |
| JP | 2004-137495 | 5/2004 |
| TW | 176610 | 1/1992 |
| TW | 344710 | 11/1998 |

OTHER PUBLICATIONS

English language Abstract of JP 2004-35832.
English language Abstract of JP 2004-136281.
English language Abstract of JP 2004-137495.
English language Abstract of JP 2001-323204.
English language Abstract of JP 2001-335736.
English language Abstract of JP 2003-49035.
English language Abstract of JP 06-220221.
English language Abstract of JP 07-102083.
English language Abstract of JP 07-205379.
English language Abstract of JP07-266441.
English language Abstract of JP08-0412218.
English language Abstract of JP10-237180.
English language Abstract of JP 2000-000931.
English language Abstract of JP 2002-020677.
English language Abstract of JP 2002-241671.
English language abstract of JP 2002-338771.
English language abstract of JP 2002-225202.
English language abstract of JP 2001-301764.
English language abstract of JP 2001-049069.
English language abstract of JP 11-034246.
English language abstract of TW 344710.
English language abstract of JTW176610.

* cited by examiner

*Primary Examiner*—Erma Cameron
(74) *Attorney, Agent, or Firm*—Greenblum & Bernstein, P.L.C.

(57) ABSTRACT

A method of producing a gas barrier laminate is disclosed that comprises: preparing a laminate comprising a plastic substrate, a gas barrier layer formed from a gas barrier layer-forming coating material comprising a polyvinyl alcohol and an ethylene-maleic acid copolymer, and a polymer layer comprising a metal compound of a bivalent or higher metal, wherein the polymer layer is laminated to at least one surface of the gas barrier layer; and heat treating the obtained laminate in the presence of water. In addition, another method of producing a gas barrier laminate is disclosed that comprises: applying a gas barrier layer-forming coating material comprising a polyvinyl alcohol and an ethylene-maleic acid copolymer, either directly onto a plastic substrate, or onto a plastic substrate with an undercoat layer disposed therebetween, and then conducting a heat treatment; and heat treating the obtained laminate in the presence of water comprising a metal compound of a bivalent or higher metal.

10 Claims, 1 Drawing Sheet

METHOD OF PRODUCING GAS BARRIER MULTILAYER BODY

TECHNICAL FIELD

The present invention relates to a method of producing a gas barrier laminate that exhibits excellent gas barrier properties, even under conditions of high humidity.

BACKGROUND ART

Thermoplastic resin films such as polyamide films and polyester films have excellent strength, transparency, and moldability, and are consequently widely used as packaging materials. However, because these thermoplastic resin films also exhibit reasonably high levels of permeability to gases such as oxygen, if this type of thermoplastic resin film is used for packaging general foodstuffs, retort foods, cosmetics, pharmaceuticals, or agricultural chemicals or the like, then during long-term storage, gases such as oxygen can permeate through the film, causing deterioration of the package contents.

As a result, laminated films produced by coating the surface of a thermoplastic resin with an emulsion or the like of polyvinylidene chloride (hereafter abbreviated as PVDC), thereby forming a PVDC layer with good gas barrier properties, are widely used for applications such as food packaging. However, PVDC generates substances such as acidic gases on incineration, and with recent advances in environmental awareness, there is considerable demand for replacing PVDC with other materials.

One example of an alternative material to PVDC is polyvinyl alcohol (hereafter abbreviated as PVA), which does not generate toxic gas, and exhibits excellent gas barrier properties under low humidity conditions. However, as the humidity increases, the gas barrier property declines rapidly, so that in most cases, PVA films cannot be used for wrapping foods that contain moisture.

One example of a polymer known to improve upon the deterioration in gas barrier properties seen for PVA under high humidity conditions is a copolymer of vinyl alcohol and ethylene (hereafter abbreviated as EVOH). However, in order to ensure that the gas barrier property is maintained at a practical level under high humidity, the proportion of ethylene within the copolymer must be increased beyond a certain level, but unfortunately, the resulting polymer becomes difficult to dissolve in water. Accordingly, in order to produce a coating agent using EVOH with a high ethylene ratio within the copolymer, either an organic solvent, or a mixed solvent of water and an organic solvent must be used, but this is undesirable from an environmental viewpoint, and also results in increased costs due to the necessity of providing a process for recovering the organic solvent.

Many techniques have been investigated with the aim of developing a liquid composition comprising a water-soluble polymer that can be coated onto a film to form a coating that exhibits favorable gas barrier properties even under conditions of high humidity. Reference 1 (Japanese Laid-Open Publication No. Hei 06-220221), reference 2 (Japanese Laid-Open Publication No. Hei 07-102083), reference 3 (Japanese Laid-Open Publication No. Hei 07-205379), reference 4 (Japanese Laid-Open Publication No. Hei 07-266441), reference 5 (Japanese Laid-Open Publication No. Hei 08-041218), reference 6 (Japanese Laid-Open Publication No. Hei 10-237180), and reference 7 (Japanese Laid-Open Publication No. 2000-000931) all disclose techniques using mixtures of PVA and either polyacrylic acid or polymethacrylic acid.

However, in the inventions proposed in the above references 1 through 7, either heat treatment at high temperature, or heat treatment over an extended period, is required to produce the desired favorable gas barrier property, meaning a large amount of energy is required during production, which places a significant burden on the environment. Furthermore, if a high temperature heat treatment is employed, then not only is there an increased danger of color changes or decomposition of the PVA and the like which constitute the barrier layer, but wrinkling can also occur in the plastic film substrate or the like onto which the barrier layer is laminated, and deformation such as curling or shrinkage can also occur, making the product unsuitable as a packaging material. In order to prevent deterioration of the plastic substrate, a special heat resistant film that is capable of withstanding the high temperature heat treatment must be used as the substrate, but this creates problems of practicality and economic viability. On the other hand, if the temperature of the heat treatment is low, then treatment must be conducted over extremely long periods, causing an undesirable fall in productivity.

Furthermore, investigations have also been conducted into resolving the above problems associated with PVA film by introducing cross-linking structures into the PVA. However, although the humidity dependence of the oxygen gas barrier property of PVA film typically decreases with increasing cross-linking density, the inherent oxygen gas barrier property of the PVA film under dry conditions tends to deteriorate, meaning it is extremely difficult to achieve a favorable oxygen gas barrier property under high humidity conditions.

Cross-linking of polymer molecules generally improves the water resistance, but the gas barrier property describes the ability of the material to prevent the penetration or diffusion of comparatively small molecules such as oxygen, and a favorable gas barrier property can not always be achieved simply by cross-linking the polymer. For example, three dimensional cross-linked polymers such as epoxy resins and phenol resins do not exhibit effective gas barrier properties.

In addition, inventions have also been proposed for producing gas barrier laminates using PVA and a maleic acid-based copolymer, which allow heat treatment to be conducted at a lower temperature, or for a shorter period, than conventional processes (reference 8: Japanese Laid-Open Publication No. 2001-323204, reference 9: Japanese Laid-Open Publication No. 2002-020677, and reference 10: Japanese Laid-Open Publication No. 2002-241671).

The inventions disclosed in these references 8 through 10 enable the production of gas barrier laminates under milder conditions than the inventions disclosed in the references 1 through 7. However, further improvement is still needed in the level of gas barrier properties achieved.

DISCLOSURE OF INVENTION

A first aspect of the present invention provides a method of producing a gas barrier laminate, comprising: preparing a laminate comprising a plastic substrate, a gas barrier layer formed from a gas barrier layer-forming coating material comprising a polyvinyl alcohol and an ethylene-maleic acid copolymer, and a polymer layer comprising a metal compound of a bivalent or higher metal, wherein the polymer layer is laminated to at least one surface of the gas barrier layer; and heat treating the obtained laminate in the presence of water.

A second aspect of the present invention provides a method of producing a gas barrier laminate, comprising: applying a gas barrier layer-forming coating material comprising a polyvinyl alcohol and an ethylene-maleic acid copolymer, either directly onto a plastic substrate, or onto a plastic substrate with an undercoat layer disposed therebetween, and then conducting a heat treatment; and heat treating the obtained laminate in the presence of water comprising a metal compound of a bivalent or higher metal.

BEST MODE FOR CARRYING OUT THE INVENTION

A method of producing a gas barrier laminate according to a first aspect of the present invention comprises a step of preparing a laminate comprising a plastic substrate, a gas barrier layer, and a polymer layer, and a step of heat treating the obtained laminate in the presence of water to produce the gas barrier laminate.

Figure 1:
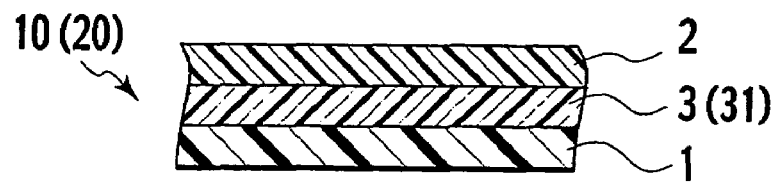
FIG. 1 is a cross-sectional view showing a schematic representation of an embodiment of a gas barrier laminate.
Figure 2:
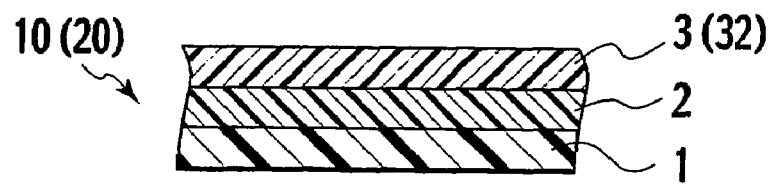
FIG. 2 is a cross-sectional view showing a schematic representation of another embodiment of a gas barrier laminate.
Figure 3:
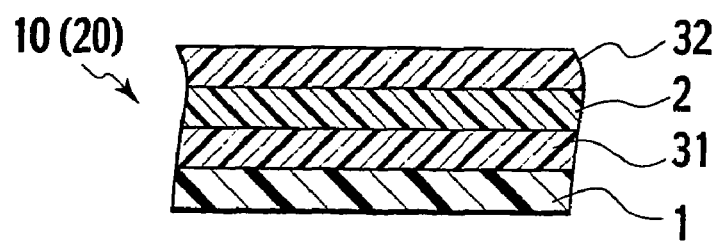
FIG. 3 is a cross-sectional view showing a schematic representation of yet another embodiment of a gas barrier laminate.

For example, as shown in FIG. 1, this laminate (or heat treated gas barrier laminate) 10 has a structure in which a plastic substrate 1, a polymer layer 3, and a gas barrier layer 2 are laminated together, in that order. Furthermore, as shown in FIG. 2, a structure in which the plastic substrate 1, the gas barrier layer 2, and the polymer layer 3 are laminated together, in this order, is also suitable. In other words, the polymer layer 3 must be laminated to at least one surface of the gas barrier layer 2. In those cases where, as shown in FIG. 1, the polymer layer 3 is positioned between the plastic substrate 1 and the gas barrier layer 2, this polymer layer 3 may also be called an undercoat layer (or UC layer 31), and in those cases where, as shown in FIG. 2, the polymer layer 3 is positioned on the non-substrate surface of the gas barrier layer 2, this polymer layer 3 may also be called an overcoat layer (or OC layer 32). In addition, as shown in FIG. 3, the laminate 10 may also have a structure in which the plastic substrate 1, a first polymer layer (UC layer) 31, the gas barrier layer 2, and a second polymer layer (OC layer) 32 are laminated together, in that order.

As described below, in the laminate 10, the polymer layer 3 is a layer that comprises a metal compound of a bivalent or higher metal, but in cases such as that shown in FIG. 3, where a plurality of polymer layers are provided as a UC layer and an OC layer and the like, the metal compound of a bivalent or higher metal may be either incorporated within a plurality of the layers, or incorporated within any one layer of that plurality. In other words, either a structure represented by "plastic substrate 1/UC layer 31 comprising metal compound/gas barrier layer 2/OC layer 32 comprising no metal compound" or a structure represented by "plastic substrate 1/UC layer 31 comprising no metal compound/gas barrier layer 2/OC layer 32 comprising metal compound" is also acceptable.

Figure 4:
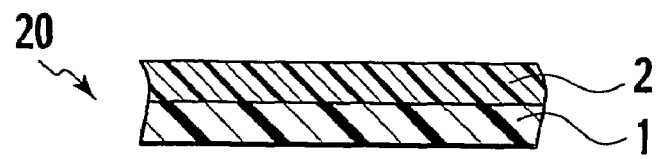
FIG. 4 is a cross-sectional view showing a schematic representation of yet another embodiment of a gas barrier laminate.

A method of producing a gas barrier laminate according to a second aspect of the present invention comprises a step of applying a gas barrier layer-forming coating material onto a plastic substrate, either directly or with a UC layer disposed therebetween, and then conducting a heat treatment to form a gas barrier layer, and a step of heat treating the obtained laminate in the presence of water comprising a metal compound of a bivalent or higher metal. In this case, the laminate (or heat treated gas barrier laminate) 20 has a structure which, as shown in FIG. 4, comprises the plastic substrate 1 and the gas barrier layer 2, and structures which do not include a polymer layer 3 are suitable, although structures which, as shown in FIGS. 1 to 3, also include a UC layer 3 (31) and/or an OC layer 3 (32) are also suitable. However, even in those cases where the structure includes a polymer layer, a metal compound of a bivalent or higher metal is not an essential component of the polymer layer (although such a metal compound may be included).

The laminate 10 of the first aspect of the present invention, in which a polymer layer comprising a metal compound of a bivalent or higher metal is an essential structural component, and the laminate 20 of the second aspect of the present invention, in which a polymer layer comprising a metal compound of a bivalent or higher metal is not an essential structural component, may also have structures wherein other plastic films or other polymer layers are laminated to any of the structures described above. For example, although not shown in the appended drawings, a layer comprising an arbitrary polymer may be formed on the surface of the plastic substrate on which the gas barrier layer and the like have not been formed, and an arbitrary layer other than the UC layer may be formed between the gas barrier layer and the plastic substrate. In such cases, in the first aspect of the present invention, the UC layer and/or the OC layer are preferably in direct contact with the gas barrier layer, in order to simplify the migration of the metal compound (E) within the UC layer and/or OC layer into the gas barrier layer. However, a layer may still be provided between the UC layer and the gas barrier layer, or between the gas barrier layer and the OC layer, provided the layer does not hinder the penetration or action of the metal compound. Similarly, in the second aspect of the present invention, any arbitrary polymer layer is preferably a layer that does not hinder the penetration of the metal compound from the treatment water into the gas barrier layer, and does not impair the actions of the metal compound.

As described below, the laminates 10 and 20 can be prepared by applying a desired thickness of a coating material for forming each of the layers onto the plastic substrate 1, the UC layer 31, or the gas barrier layer 2 respectively, using a method such as roll coating, gravure coating, gravure offset coating, spray coating, or a combination of these methods, although the invention is not restricted to these coating methods.

(1) Plastic Substrate

The plastic substrate 1 of the laminate 10 or 20 is either a film-like substrate, produced from a heat moldable thermoplastic resin using a technique such as extrusion molding, injection molding, blow molding, stretch blow molding, or draw molding, or alternatively, is a substrate that has been molded into the shape of a container such as a bottle, a cup, or a tray. Of these, film-like substrates are preferred, and films with excellent transparency are particularly desirable. If a packaging material is produced using a gas barrier laminate produced using a highly transparent plastic substrate, then the contents can be viewed from outside the wrapped package.

The plastic substrate may either comprise a single layer, or comprise a plurality of layers produced by simultaneous melt extrusion or some other lamination process.

An unstretched film can be used as the plastic substrate, and a gas barrier layer-forming coating material or UC layer-forming coating material (UC composition) described below then applied to the substrate and dried, before stretching treatment is conducted. For example, following drying, the film can be supplied to a tenter stretching frame, and stretched simultaneously in the longitudinal direction and the transverse direction (simultaneous biaxial stretching), before being heat treated. Alternatively, the film can first be stretched in the longitudinal direction using a multistage heated roller device or the like, and the gas barrier layer-forming coating material then applied and dried, before stretching is conducted in the transverse direction using a tenter stretching frame (sequential biaxial stretching). Furthermore, it is also possible to combine the longitudinal stretching with the tenter-based simultaneous biaxial stretching.

Suitable examples of the thermoplastic resin used for forming the plastic substrate include olefin-based copolymers, polyesters, polyamides, styrene-based copolymers, vinyl chloride-based copolymers, acrylic copolymers, and polycarbonates, and of these, olefin-based copolymers, polyesters, and polyamides are preferred.

Examples of suitable olefin-based copolymers include low-, medium-, and high-density polyethylene, linear low-density polyethylene, polypropylene, ethylene-propylene copolymers, ethylene-butene copolymers, ionomers, ethylene-vinyl acetate copolymers, and ethylene-vinyl alcohol copolymers; examples of suitable polyesters include polyethylene terephthalate (PET), polybutylene terephthalate, PET/isophthalate, and polyethylene naphthalate; examples of suitable polyamides include nylon 6, nylon 6,6, nylon 6,10, and meta-xylylene adipamide; examples of suitable styrene-based copolymers include polystyrene, styrene-butadiene block copolymers, styrene-acrylonitrile copolymers, and styrene-butadiene-acrylonitrile copolymers (ABS resins); examples of suitable vinyl chloride-based copolymers include polyvinyl chloride and vinyl chloride-vinyl acetate copolymers; and examples of suitable acrylic copolymers include polymethylmethacrylate and methyl methacrylate-ethyl acrylate copolymers.

These thermoplastic resins may be used either alone, or in mixtures of two or more different resins.

If required, the above thermoplastic resin may also contain either one, or two or more additives such as pigments, antioxidants, antistatic agents, ultraviolet absorbers, or lubricants, which can be added in a combined quantity within a range from 0.001 to 5.0 parts by weight per 100 parts by weight of the resin.

In those cases where, as described below, a gas barrier laminate obtained using the present invention is used for forming a packaging material, then in order to ensure adequate strength as a packaging material, any of the various reinforced plastics can be used as the plastic substrate for forming the gas barrier laminate. In other words, either one, or two or more reinforcing fibers such as glass fiber, aromatic polyamide fiber, carbon fiber, pulp, or cotton linter; powdered reinforcing materials such as carbon black or white carbon; or flake-like reinforcing materials such as glass flakes or aluminum flakes can be blended into the thermoplastic resin in a combined quantity within a range from 2 to 50 parts by weight per 100 parts by weight of the thermoplastic resin.

In order to increase the weight, either one, or two or more extenders such as heavy or light calcium carbonate, mica, talc, kaolin, gypsum, clay, barium sulfate, alumina powder, silica powder, or magnesium carbonate may also be blended into the resin using conventional methods, in a combined quantity within a range from 5 to 100 parts by weight per 100 parts by weight of the thermoplastic resin.

In addition, in order to improve the gas barrier property, scaly fine inorganic powders such as water-swelling mica or clay may also be blended into the resin using conventional methods, in a combined quantity within a range from 5 to 100 parts by weight per 100 parts by weight of the thermoplastic resin.

(2) Gas Barrier Layer

The gas barrier layer 2 (or D) of the laminate 10 or 20 is formed from a gas barrier layer-forming coating material (C). This gas barrier layer-forming coating material (C) is applied to the aforementioned plastic substrate or the like to impart gas barrier properties, and comprises PVA (A) and an ethylene-maleic acid copolymer (hereafter abbreviated as EMA) (B).

<PVA (A)>

The polyvinyl alcohol (A) can be obtained using known methods, such as by complete or partial saponification of a vinyl ester polymer (or a copolymer of a vinyl ester and another vinyl compound, as described below).

Examples of suitable vinyl esters include vinyl formate, vinyl acetate, vinyl propionate, vinyl pivalate, and vinyl versatate, and of these, vinyl acetate is industrially the most preferred.

Another vinyl compound (vinyl-based monomer) may also be copolymerized with the vinyl ester, provided such copolymerization does not impair the effects of the present invention. Suitable examples of this other vinyl compound include unsaturated monocarboxylic acids such as crotonic acid, acrylic acid, and methacrylic acid, as well as the esters, salts, anhydrides, amides, and nitriles thereof; unsaturated dicarboxylic acids such as maleic acid, itaconic acid, and fumaric acid, as well as the salts thereof; α-olefins of 2 to 30 carbon atoms; alkyl vinyl ethers; and vinylpyrrolidone. From a production viewpoint, the polymer contained within the gas barrier layer-forming coating material (C) is preferably water-soluble. Accordingly, hydrophobic copolymer components are preferably introduced at levels that do not impair the water solubility of the PVA (A).

Known alkali saponification methods or acid saponification methods can be used as the method of saponifying the vinyl ester (co)polymer, and of these, a method in which alcoholysis is conducted in methanol using an alkali hydroxide is preferred. Saponification degree values close to 100% are preferred in terms of producing a favorable gas barrier property, and if the saponification degree is too low, the barrier performance deteriorates. The saponification degree is preferably at least approximately 95%, and even more preferably 98% or greater.

The average polymerization degree of the PVA (A) is preferably within a range from 50 to 4,000, and is even more preferably from 200 to 3,000.

<EMA (B)>

The ethylene-maleic acid copolymer (B) can be obtained by polymerization using known methods, such as a solution radical polymerization of maleic anhydride and ethylene. Small quantities of other vinyl compounds can also be included in the copolymerization, provided such addition does not impair the effects of the present invention. Examples of suitable other vinyl compounds include acrylate esters such as methyl acrylate, methyl methacrylate, ethyl acrylate, ethyl methacrylate, butyl acrylate, and butyl methacrylate; vinyl esters such as vinyl formate and vinyl acetate; styrene and p-styrenesulfonic acid; olefins of 3 to 30 carbon atoms such as propylene and isobutylene; and other compounds with reactive groups capable of reacting with the hydroxyl groups of the PVA.

Maleic acid units preferably account for at least 10 mol % of the EMA (B), and an alternating copolymer of ethylene and maleic anhydride in which the maleic acid units are substantially equimolar is particularly preferred. If the quantity of maleic acid units is less than 10 mol %, then insufficient cross-linking structures are formed through reaction with the PVA units, which increases the danger of a deterioration in the gas barrier property.

The weight average molecular weight of the EMA (B) is preferably within a range from 3,000 to 1,000,000 (one million), and even more preferably from 5,000 to 900,000, and most preferably from 10,000 to 800,000.

The maleic acid units within the EMA (B) tend to form maleic anhydride structures in dry conditions, through a cyclodehydration of the adjacent carboxyl groups, and then undergo ring opening to form maleic acid structures in humid conditions or in an aqueous solution.

The gas barrier layer-forming coating material (C) preferably exhibits a weight ratio between the PVA (A) and the EMA (B) that falls within a range from (A):(B)=90:10 to 10:90, and even more preferably from 70:30 to 15:85, even more preferably from 60:40 to 20:80, and most preferably from 50:50 to 25:75. If the relative quantity of either the PVA (A) or the EMA (B) is excessively high, then there is a danger that the effect of the invention in improving the gas barrier property will lessen, even if the heat treatment is conducted in the presence of water.

Both the PVA (A) and the EMA (B) may comprise two or more different materials, and in such cases, the respective combined weights of the different materials preferably satisfy the above weight ratio range.

The coating material (C) may also comprise an inorganic layered compound. By incorporating an inorganic layered compound, the gas barrier properties of the gas barrier layer and the gas barrier laminate can be further improved.

From the viewpoint of the gas barrier property, incorporating a large quantity of an inorganic layered compound is preferred. However, inorganic layered compounds display a strong affinity for water, and are prone to moisture absorption. Furthermore, coatings that comprise an inorganic layered compound tend to be prone to increases in viscosity, resulting in a corresponding loss in coatability. In addition, if the inorganic layered compound content is too high, then there is a danger that the transparency of the formed gas barrier layer or gas barrier laminate may deteriorate.

Considering these issues, the quantity of the inorganic layered compound is preferably within a range from 1 to 300 parts by weight, and even more preferably from 2 to 200 parts by weight, and is most preferably no more than 100 parts by weight, per 100 parts by weight of the combined weight of the PVA (A) and the EMA (B).

In this description, the term "inorganic layered compound" refers to an inorganic compound in which unit crystal layers are superimposed to form a layered structure, and compounds which swell and undergo cleavage within solvents are preferred.

Examples of preferred inorganic layered compounds include montmorillonite, beidellite, saponite, hectorite, sauconite, vermiculite, fluoromica, muscovite, paragonite, phlogopite, biotite, lepidolite, margarite, clintonite, anandite, chlorite, donbassite, sudoite, cookeite, clinochlore, chamosite, nimite, tetrasilylic mica, talc, pyrophyllite, nacrite, kaolinite, halloysite, chrysotile, sodium taeniolite, xanthophyllite, antigorite, dickite, and hydrotalcite, and of these, swelling fluoromica or montmorillonite are particularly preferred.

These inorganic layered compounds may be naturally formed materials, artificially synthesized or modified materials, or compounds that have been treated with organic materials such as onium salts.

A swelling fluoromica-based mineral can be represented by the formula (1) shown below, and is the most preferred compound in terms of its degree of whiteness.

$$\alpha(MF)\cdot\beta(aMgF_2 \cdot bMgO)\cdot\gamma SiO_2 \tag{1}$$

(In the formula (1), M represents sodium or lithium, and $\alpha$, $\beta$, $\gamma$, a, and b each represent a coefficient, wherein $0.1 \leq \alpha \leq 2$, $2 \leq \beta \leq 3.5$, $3 \leq \gamma \leq 4$, $0 \leq a \leq 1$, $0 \leq b \leq 1$, and a+b=1.)

One method of producing this type of swelling fluoromica-based mineral is a so-called melt method, wherein silicon oxide, magnesium oxide, and various fluorides are mixed together, the resulting mixture is heated at 1,400 to 1,500° C. in an electric or gas oven until the components have completely melted, and crystals of the fluoromica-based mineral are then grown within the reaction vessel during the cooling process.

A method has also been disclosed for obtaining a swelling fluoromica-based mineral using talc as a starting material, by intercalating alkali metal ions within the talc (Japanese Laid-Open Publication No. Hei 2-149415, the content of which is incorporated herein by reference). In this method, the talc is mixed with an alkali silicofluoride or an alkali fluoride, and the mixture is then subjected to a short heat treatment in a magnetic crucible at a temperature of approximately 700 to 1,200° C., thereby yielding the swelling fluoromica-based mineral. In this method, the quantity of the alkali silicofluoride or alkali fluoride mixed with the talc preferably accounts for 10 to 35% by weight of the resulting mixture, and if the quantity falls outside this range, then the yield of the swelling fluoromica-based mineral declines undesirably. The alkali metal of the alkali silicofluoride or alkali fluoride is preferably either sodium or lithium. These alkali metals may be used either alone, or in combination. Of these alkali metals, if potassium is used, then a swelling fluoromica-based mineral cannot be obtained, although potassium can be used in limited quantities in combination with either sodium or lithium, to aid regulation of the swelling characteristics.

In addition, a small quantity of alumina may also be added during production of the swelling fluoromica-based mineral to regulate the swelling characteristics of the produced swelling fluoromica-based mineral.

Montmorillonite is represented by a formula (2) shown below, and can be obtained by purifying naturally occurring material.

$$M_a Si_4(Al_{2-a}Mg_a)O_{10}(OH)_2 \cdot nH_2O \tag{2}$$

(In the formula (2), M represents a sodium cation, and a represents a number from 0.25 to 0.60. Furthermore, the number of water molecules bonded to the interlayer ion exchange cations varies depending on the nature of the cation and conditions such as the humidity, and this variability is expressed by the nH$_2$O in the formula.)

Montmorillonite also includes the homeotypical ion-substituted materials of magnesian montmorillonite, iron montmorillonite, and iron magnesian montmorillonite, represented by the following formulas (3) through (5) respectively, and these materials can also be used.

$$M_a Si_4(Al_{1.67-a}Mg_{0.5+a})O_{10}(OH)_2 \cdot nH_2O \tag{3}$$

$$M_a Si_4(Fe^{3+}_{2-a}Mg_a)O_{10}(OH)_2 \cdot nH_2O \tag{4}$$

$$M_a Si_4(Fe^{3+}_{1.67-a}Mg_{0.5+a})O_{10}(OH)_2 \cdot nH_2O \tag{5}$$

(In the formulas (3) to (5), M represents a sodium cation, and a represents a number from 0.25 to 0.60.)

Normally, montmorillonite contains ion exchange cations such as sodium or calcium between the layers of the material, but the quantity of these cations varies depending on the location from which the material is sourced. Of these materials, a montmorillonite in which an ion exchange process has been used to substitute these interlayer ion exchange cations with sodium is preferred. Furthermore, the use of montmorillonite that has been purified by water treatment is also preferred.

Although the inorganic layered compound can be mixed directly with the PVA (A) and the EMA (B), it is preferably swollen and dispersed in a liquid medium prior to mixing. Although there are no particular restrictions on this liquid medium used for swelling and dispersing the inorganic layered compound, in the case of a natural swelling clay-based mineral, water, alcohols such as methanol, ethanol, propanol, isopropanol, ethylene glycol, and diethylene glycol, as well as dimethylformamide, dimethylsulfoxide, and acetone are preferred, and water or alcohols such as methanol are particularly preferred.

One or more additives such as heat stabilizers, antioxidants, reinforcing agents, pigments, age resistors, weather-proofing agents, flame retardants, plasticizers, mold release agents, and lubricants may also be added to the coating material (C), provided such addition does not significantly impair the characteristics of the coating material.

Examples of suitable heat stabilizers, antioxidants, and age resistors include hindered phenols, phosphorus compounds, hindered amines, sulfur compounds, copper compounds, alkali metal halides, and mixtures thereof.

The concentration (that is, the solid fraction) of the coating material (C) can be suitably adjusted in accordance with the specifications of the application device, and/or the drying and heating device, although if the solution is overly dilute, then applying a thick enough coating to ensure a satisfactory gas barrier property becomes difficult, and the subsequent drying process tends to require an inordinately long period of time. In contrast, if the concentration of the coating material (C) is too high, then achieving a homogenous coating material becomes difficult, and coatability problems tend to develop. Considering these factors, typically, the concentration (the solid fraction) of the coating material (C) is preferably within a range from 5 to 50% by weight.

The gas barrier layer 2 is produced by applying the gas barrier layer-forming coating material (C) described above, comprising the PVA (A) and the EMA (B), to either the plastic substrate 1 or the UC layer 31, and then conducting a heat treatment. The heating causes an esterification reaction between the PVA (A) and the EMA (B), and an etherification reaction between molecules of the PVA (A), thus generating a gas barrier layer with excellent water resistance. In other words, by applying the coating material (C) and then conducting a heat treatment, reactions such as the esterification reaction between the PVA (A) and the EMA (B) are initiated, and a gas barrier layer is formed that can be termed a precursor to the final gas barrier layer obtained as a result of the water heat treatment described below.

The heat treatment conditions for the coating material (C) during formation of the gas barrier layer 2 are affected by factors such as the ratio between the PVA (A) and the EMA (B) within the coating material (C), and although it is impossible to generalize regarding the ideal heat treatment conditions, the heat treatment is preferably conducted at a temperature of at least 100° C. but no more than 300° C., even more preferably at a temperature of at least 120° C. but no more than 250° C., even more preferably at a temperature of at least 140° C. but no more than 240° C., and most preferably at a temperature of at least 160° C. but no more than 220° C.

Specifically, conducting the heat treatment for at least 90 seconds at a temperature of at least 100° C. but less than 140° C., or for at least 1 minute at a temperature of at least 140° C. but less than 180° C., or for at least 30 seconds at a temperature of at least 180° C. but less than 250° C. is preferred; conducting the heat treatment for at least 2 minutes at a temperature of at least 100° C. but less than 140° C., or for at least 90 seconds at a temperature of at least 140° C. but less than 180° C., or for at least 1 minute at a temperature of at least 180° C. but less than 240° C. is even more preferred; and conducting the heat treatment for at least 4 minutes at a temperature of at least 100° C. but less than 140° C., or for at least 3 minutes at a temperature of at least 140° C. but less than 180° C., or for approximately 2 minutes at a temperature of at least 180° C. but less than 220° C. is particularly desirable.

If the temperature of the heat treatment is too low, or the treatment time is too short, then the esterification reaction does not proceed adequately, and there is a danger that the water resistance of the gas barrier layer 2 or the gas barrier laminate 10 or 20 may be inadequate. In contrast, if the heat treatment is conducted at a temperature exceeding 300° C., then deformation, wrinkling, or thermal decomposition can occur within the formed gas barrier layer or the plastic substrate, increasing the likelihood of a deterioration in properties including the gas barrier property.

Although longer heat treatment times tend to result in improved gas barrier properties under conditions of high humidity, if other factors such as productivity, and thermal deformation or deterioration of the plastic substrate are also considered, then the heat treatment time is preferably no more than 1 hour, and is even more preferably 30 minutes or less, and most preferably 20 minutes or less.

In order to ensure a sufficiently improved gas barrier property for the laminate, the thickness of the gas barrier layer is preferably greater than 0.1 μm.

(3) Polymer Layer (UC Layer, OC Layer)

The polymer layer 3 (or F) of the laminate 10 (of the first aspect of the present invention) comprises a metal compound (E) of a bivalent or higher metal. As described above, this metal compound (E) may be incorporated within either the UC layer (or F1) or the OC layer (or F2), both of which function as polymer layers 3, or in those cases where both the UC layer 31 and the OC layer 32 are formed (see FIG. 3), may be incorporated within both layers, or within either one of the two layers. Furthermore, in the second aspect of the present invention, the metal compound (E) is contained within the water used for treating the laminate 20 (described below).

<Metal Compound (E)>

The metal compound (E) is a metal compound of a bivalent or higher metal (also referred to as a bivalent or higher metal compound). The compound is preferably capable of reacting with hydroxyl groups or carboxyl groups. It is thought that the metal compound (E), which has migrated into the gas barrier layer 2 as a result of the action of water on the formed gas barrier laminate 10 or 20 as described below, forms favorable cross-linking structures by reaction with hydroxyl groups or carboxyl groups. These generated cross-linking structures may be coordination bonds as well as ionic or covalent bonds. When exposed to the action of water, the metal compound (E) must migrate from the polymer layer (in the case of the first aspect of the present invention) or the treatment water (in the case of the second aspect of the present invention) into the gas barrier layer, and consequently the metal compound (E) preferably exhibits excellent affinity for water, and is preferably water-compatible, namely, water-soluble. However, even compounds that are typically known as sparingly soluble or insoluble in water can still be used satisfactorily by appropriate control of the water treatment conditions.

Examples of metal compounds (E) that are capable of reacting with hydroxyl groups or carboxyl groups include bivalent or higher metal halides, hydroxides, oxides, carbonates, acetates, phosphates, phosphites, hypophosphites, sulfates, hydrochlorides, nitrates, or sulfites (E1); as well as zirconium complex salts, zirconium halides, zirconium salts of inorganic acids, or zirconium salts of organic acids (E2), and of these, the metal compounds (E1) are preferred. Of the various metal compounds (E1), bivalent or higher metal hydroxides, oxides, carbonates, acetates, phosphates, phosphites, hypophosphites, sulfates, hydrochlorides, or nitrates are preferred, one or more compounds selected from the group consisting of hydroxides, carbonates, acetates, and phosphates is even more preferred, and either one, or two or more hydroxides or carbonates are particularly desirable.

As the bivalent or higher metal, Mg, Ca, Zn, Cu, Co, Fe, Ni, Al, or Zr is preferred, Mg or Ca is even more preferred, and Mg is the most desirable.

The metal compound (E) of the bivalent or higher metal may use a single compound selected from either one of the groups E1 or E2, may use a combination of two or more compounds selected from within either one of the groups E1 or E2, or may also use a combination of one or more compounds selected from each of the groups E1 and E2.

Specific examples of the metal compound (E1) include Mg compounds such as MgO, $Mg(OH)_2$, $MgSO_4$, $MgCl_2$, $MgCO_3$, $Mg(CH_3COOH)_2$, and $Mg_3(PO_4)_2$, and Ca compounds such as CaO, $Ca(OH)_2$, $CaSO_4$, $CaCl_2$, $CaCO_3$, $Ca(CH_3COOH)_2$, and $Ca_3(PO_4)_2$.

Examples of the metal compound (E2) include zirconium halides such as zirconium oxychloride, zirconium hydroxychloride, zirconium tetrachloride, and zirconium bromide; zirconium salts of mineral acids such as zirconium sulfate, zirconium basic sulfate, and zirconium nitrate; zirconium salts of organic acids such as zirconium formate, zirconium acetate, zirconium propionate, zirconium caprylate, and zirconium stearate; and zirconium complex salts such as zirconium ammonium carbonate, zirconium sodium sulfate, zirconium ammonium acetate, zirconium sodium oxalate, zirconium sodium citrate, and zirconium ammonium citrate, and of these, zirconium ammonium carbonate is preferred. An example of a commercially available zirconium ammonium carbonate product is Zircosol AC-7, manufactured by Newtechs Co., Ltd.

In the first aspect of the present invention, where the metal compound (E) is incorporated within the polymer layer 3 of the laminate 10, Mg compounds such as MgO, $Mg(OH)_2$, and $MgSO_4$, or Ca compounds such as CaO, $Ca(OH)_2$, and $CaSO_4$ are particularly preferred.

In the second aspect of the present invention, when the metal compound (E) is incorporated within the water used for heat treating the laminate 20, Mg compounds such as $Mg(OH)_2$, $MgCO_3$, $Mg(CH_3COOH)_2$, and $Mg_3(PO_4)_2$, or Ca compounds such as $Ca(OH)_2$, $CaCO_3$, $Ca(CH_3COOH)_2$, and $Ca_3(PO_4)_2$ are preferred, and $Mg(OH)_2$, $MgCO_3$, $Ca(OH)_2$, and $CaCO_3$ are particularly desirable. In those cases where $Mg(OH)_2$, $MgCO_3$, $Ca(OH)_2$, and/or $CaCO_3$ are used as the metal compounds incorporated within the water used for heat treating the laminate 20, these compounds may either be used alone, or because they exhibit only low solubility in water, may be combined with other metal compounds such as the sulfates, hydrochlorides, or nitrates or the like of Mg, Ca, or Na.

In those cases where either one of the UC layer and the OC layer of the laminate 10 comprises the metal compound (E), the coating material (composition) for forming the UC layer or OC layer preferably comprises from 0.2 to 40 parts by weight of the above metal compound per 100 parts by weight of the polymer component, with quantities from 0.3 to 20 parts by weight being even more preferred, and quantities from 0.5 to 10 parts by weight being the most desirable.

In those cases where the water used for heat treating the laminate 20 comprises the metal compound (E), the quantity of the metal compound, reported as a metal ion concentration, is preferably within a range from 3 to 3,000 ppm, even more preferably from 10 to 500 ppm, even more preferably from 20 to 300 ppm, and most preferably from 30 to 200 ppm. More specifically, for each 1 $m^2$ of the laminate, the water preferably comprises at least 0.008 g, and even more preferably 0.08 g or more, and most preferably 0.8 g or more, of Mg and Ca.

In addition, as the counter ion to the bivalent or higher metal within the water used for heat treating the laminate 20, the water preferably contains at least 0.008 g, and even more preferably 0.08 g or more, and most preferably 0.8 g or more, of carbonate ions.

In those cases where the polymer layer 3 is a UC layer 31, the UC layer is positioned between the gas barrier layer 2 and the plastic substrate 1, and has a primary function of improving the adhesion of the gas barrier layer 2.

The polymer for the UC layer can use a variety of different polymers, including urethane, polyester, acrylic, and epoxy-based polymers, although urethane-based polymers are preferred.

In the case of a urethane-based UC layer, the gas barrier laminate comprising the plastic substrate 1, the UC layer 31, and the gas barrier layer 2 can be produced using any of the methods described below.

(i) A UC composition comprising a polyol component such as a polyester polyol or a polyether polyol and a polyisocyanate component is applied to the plastic substrate and then heated, thereby causing a reaction between the polyol component and the polyisocyanate component to form a urethane-based UC layer. A solution of the above coating material (C) is then applied to the thus formed UC layer and heated, thereby forming the gas barrier layer on top of the UC layer.

(ii) The same UC composition as that used in the above method (i) is applied to the plastic substrate and dried, forming a UC layer precursor in which the reaction between the polyol component and the polyisocyanate component has not proceeded to completion, and a solution of the above coating material (C) is then applied to the surface of this precursor and heated, thereby forming the UC layer and the gas barrier layer in a single step.

(iii) The same UC composition as that used in the above method (i) is applied to the plastic substrate, and before any heating is conducted, the above coating material (C) is then applied, and heating is then used to form the UC layer and the gas barrier layer in a single step.

The polyisocyanate incorporated within the UC composition can also react with the hydroxyl groups of the PVA (A) at the interface region with the gas barrier layer, which not only contributes to improved adhesion, but is also thought to assist in the cross-linking of the gas barrier layer, thereby improving the water resistance, and consequently, the methods (ii) and (iii) are preferred.

The polyol component used in the formation of the UC layer is preferably a polyester polyol, and examples of suitable polyester polyols include those formed by reaction of a polyvalent carboxylic acid or a dialkyl ester thereof, or a mixture of the two, with a glycol or a mixture of glycols. Examples of suitable polyvalent carboxylic acids include aromatic polyvalent carboxylic acids such as isophthalic acid, terephthalic acid, and naphthalenedicarboxylic acid; and aliphatic polyvalent carboxylic acids such as adipic acid, azelaic acid, sebacic acid, and cyclohexanedicarboxylic acid. Examples of suitable glycols include ethylene glycol, propylene glycol, diethylene glycol, butylene glycol, neopentyl glycol, and 1,6-hexanediol.

These polyester polyols preferably have a glass transition temperature (hereafter referred to as Tg) within a range from −50° C. to 120° C., and even more preferably from −20° C. to 100° C., and most preferably from 0° C. to 90° C. The ideal Tg value for the polyester polyol varies depending on the heat curing conditions used during the heat curing process conducted following application of the gas barrier layer-forming coating material (C). If the coating material (C) is heat cured at a comparatively low temperature, then a polyester polyol with a comparatively high Tg value is preferred, whereas if heat curing is conducted at a comparatively high temperature, then polyester polyols with Tg values across a comparatively broad range from low temperatures to high temperatures can be favorably used. For example, if the coating material (C) is heat cured at 180° C., then polyester polyols with Tg values within a range from approximately 70 to 90° C. are preferred. In contrast, if the coating material (C) is heat cured at 200° C., then polyester polyols with Tg values within a range from 0 to 90° C. can be used.

The number average molecular weight of these polyester polyols is preferably within a range from 1,000 to 100,000 (hundred-thousand), and even more preferably from 3,000 to 50,000, and most preferably from 10,000 to 40,000.

Examples of the polyisocyanate used in the formation of the UC layer include aromatic polyisocyanates such as 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, xylylene diisocyanate, and tetramethylxylylene diisocyanate; aliphatic polyisocyanates such as tetramethylene diisocyanate, 1,6-hexamethylene diisocyanate, dodecamethylene diisocyanate, trimethylhexamethylene diisocyanate, 1,3-cyclohexylene diisocyanate, 1,4-cyclohexylene diisocyanate, hydrogenated xylylene diisocyanate, lysine diisocyanate, isophorone diisocyanate, 4,4'-dicyclohexylmethane diisocyanate, and 3,3'-dimethyl-4,4'-dicyclohexylmethane diisocyanate; polyfunctional polyisocyanate compounds such as isocyanurates, biurets, and allophanates derived from the above polyisocyanate monomers; and polyfunctional polyisocyanate compounds containing terminal isocyanate groups, obtained through reaction with a trifunctional or higher polyol compound such as trimethylolpropane or glycerol. A trimer of hexamethylene diisocyanate, which represents a trifunctional isocyanurate, is preferred.

The weight ratio between the polyester polyol and the polyisocyanate is preferably within a range from 10:90 to 99:1, and even more preferably from 30:70 to 90:10, and most preferably from 50:50 to 85:15.

The thickness of the UC layer can be determined in accordance with the intended application, but is preferably within a range from 0.1 to 10 μm, and even more preferably from 0.1 to 5 μm, and most preferably from 0.1 to 1 μm. If the thickness is less than 0.1 μm, then achieving the desired level of adhesion can be difficult, whereas if the thickness exceeds 10 μm, problems become increasingly likely during the production steps such as the coating step.

The concentration of the polyester polyol and the polyisocyanate within the UC composition can be adjusted using an appropriate solvent, and the concentration of the combination of the two components is preferably within a range from 0.5 to 80% by weight, and even more preferably from 1 to 70% by weight. If the solution concentration is too low, then forming a coating of the required thickness becomes difficult, and an undesirably large quantity of heat is required during the drying process. In contrast, if the solution concentration is too high, then the viscosity of the solution becomes overly high, increasing the danger of a deterioration in the ease with which operations such as mixing and coating can be conducted.

Examples of solvents that can be used in the UC composition include toluene, MEK (methyl ethyl ketone), cyclohexanone, solvent naphtha, isophorone, xylene, MIBK (methyl isobutyl ketone), ethyl acetate, and butyl acetate, although this is in no way an exhaustive list.

In addition to the components described above, the UC layer may also include one or more conventional additives such as curing-accelerating catalysts, fillers, softeners, age resistors, stabilizers, adhesion promoters, leveling agents, antifoaming agents, plasticizers, inorganic fillers, adhesion-imparting resins, fibers, colorants such as pigments, and life extenders.

Next is a description of the OC layer 32. The OC layer, like the UC layer, can be formed from a variety of materials, using a variety of different methods. Some examples are described below.

(i) A solution of the coating material (C) is applied to the plastic substrate or the UC layer and then heated, thereby forming the gas barrier layer 2 generated by the reaction of the PVA (A) and the EMA (B), and a coating material for forming the OC layer (the OC composition) is then applied to the gas barrier layer 2 and heated, thus forming the OC layer.

(ii) A solution of the coating material (C) is applied to the plastic substrate or the UC layer and then dried, thereby forming a film-like coating material layer (gas barrier layer) in which the reaction of the PVA (A) and the EMA (B) has not proceeded to completion, and the OC composition is then applied to this coating material layer and heated, thereby enabling the reaction between the PVA (A) and the EMA (B), and the formation of the OC layer to occur simultaneously.

(iii) A solution of the coating material (C) is applied to the plastic substrate or the UC layer, and without conducting any drying, the OC composition is then applied and heated, thereby enabling the reaction between the PVA (A) and the EMA (B), and the formation of the OC layer to occur simultaneously.

The thickness of the OC layer, like the UC layer, is preferably within a range from 0.1 to 10 μm, and even more preferably from 0.1 to 5 μm, and most preferably from 0.1 to 2.5 μm.

(4) Heat Treatment of Laminate in the Presence of Water (Water Heat Treatment)

The laminate obtained in the manner described above is either subjected to heat treatment in the presence of water in the case of the first aspect of the present invention, or subjected to heat treatment in the presence of water comprising the metal compound (E) (metal compound (E)-containing water) in the case of the second aspect of the present invention. In both cases, this treatment enables the production of a gas barrier laminate with a dramatically improved gas barrier property. In the first aspect of the present invention, the laminate 10 may also be subjected to heat treatment in the presence of metal compound (E)-containing water. In the following description, the heat treatment in the presence of water is also referred to as "water heat treatment"

One possible method of introducing the metal compound (E) into the gas barrier layer is a method in which a gas barrier layer-forming coating material which incorporates the metal compound (E) is used for forming the gas barrier layer, but the present invention uses a method wherein the gas barrier layer is formed first, and the metal compound (E) is subsequently introduced into the gas barrier layer from externally. In other words, the first aspect of the present invention utilizes the metal compound (E) within the polymer layer adjacent to the gas barrier layer, whereas the second aspect of the present invention utilizes the metal compound (E) within the treatment water. Accordingly, in the present invention, the gas barrier layer-forming coating material (C) need not necessarily contain the metal compound (E), although it may contain the metal compound (E).

Until now, it had been thought that in the heating process following the application of the coating material, higher heating temperatures or longer heat treatment times were necessary in order to achieve a satisfactory esterification reaction between the hydroxyl groups within PVA and the COOH groups of a polyacrylic acid or the like, or to achieve a satisfactory cross-linking reaction between the above functional groups and a metal. However, considering factors such as the heat resistance of the plastic substrate itself and the gradually forming gas barrier layer, there are practical limits to how far the gas barrier property under high humidity conditions can be improved by using heat to introduce a variety of cross-linking structures, and even if the heating conditions are set to higher temperatures and/or longer treatment times, there is a certain value below which the oxygen permeability will not fall, and in actual fact, a reverse phenomenon in which the oxygen permeability actually increases is observed.

In contrast, although the detailed mechanism as to why the gas barrier property improves remains unclear, as described above, by heating a gas barrier layer, which is formed by heat treating a coating material (C), in the presence of water, thereby introducing a metal compound (E) into the gas barrier layer, a gas barrier laminate with far superior gas barrier properties to conventional products can be obtained with no accompanying thermal deterioration of the plastic substrate itself or the gas barrier layer. It is thought that by subjecting a gas barrier laminate to water heat treatment, the metal compound (E) migrates either from the polymer layer into the adjacent gas barrier layer, or from the water into the gas barrier layer, thus forming a dense structure generated by cross-linking between PVA (A) and PVA (A), between PVA (A) and EMA (B), and between EMA (B) and EMA (B), and as a result, enabling an improvement in the oxygen gas barrier property under conditions of high humidity. Accordingly, in the present invention, the metal compound (E) may also be referred to as the metal cross-linking agent, or simply the cross-linking agent.

Although the metal compound (E) preferably migrates uniformly through the thickness direction of the gas barrier layer, contributing to cross-linking throughout the layer, a layer with a concentration distribution is also acceptable.

The UC layer and OC layer themselves exhibit no function for improving the oxygen gas barrier property under high humidity conditions.

Examples of suitable methods of treating the gas barrier laminate (the laminate) 10 or 20 in water include the methods described below, and combinations of these methods may also be used.
(i) Immersing the laminate in water (or hot water).
(ii) Spraying water (or hot water) onto the laminate in the form of a mist or shower.
(iii) Placing the laminate in a high humidity environment.
(iv) Exposing the laminate to water vapor. The laminate may also be sprayed with water vapor while being heated with heated rollers.

In any of the above methods, the gas barrier laminate may be heated, the atmospheric temperature raised, or if necessary the treatment pressure raised or reduced, to facilitate the action of the water. In the treatment of the laminate 20, water that comprises the metal compound (E) should be used, and local tap water can also be used. Furthermore, tap water can also be used for the treatment of the laminate 10.

The temperature of the water used in this treatment, or the temperature of the treatment environment (namely, the heat treatment temperature), is preferably at least 90° C., even more preferably 95° C. or higher, even more preferably within a range from 100 to 140° C., and is most preferably from 110 to 130° C. Furthermore, the treatment time is preferably at least 1 minute, even more preferably 10 minutes or longer, and most preferably 20 minutes or longer. Although higher water temperatures or treatment environment temperatures, and longer treatment times are preferred, if other factors such as productivity, economic viability, and energy conservation are also considered, then for practical purposes, the temperature is preferably no more than approximately 140° C., and the treatment time no longer than approximately 1 hour.

By subjecting the gas barrier laminate to water heat treatment in this manner, it is thought that in addition to the formation of cross-linking structures derived from the metal compound (E), there is a possibility that some form of change may also occur within the gas barrier layer itself, causing a dramatic improvement in the gas barrier property.

Although the results of this treatment also vary depending on the treatment conditions, making it difficult to generalize, this water heat treatment enables the oxygen permeability under high humidity to be reduced to a value that is 1/2.1 to 1/62 that of the permeability prior to treatment, thus enabling an improvement in the oxygen gas barrier property.

For example, an oxygen permeability measured under conditions including a temperature of 25° C. and 80% relative humidity of approximately 25 cc·µm/m$^2$·24 h·atm prior to treatment can be reduced to approximately 0.4 cc·µm/m$^2$·24 h·atm by the water heat treatment.

When packaging foodstuffs in containers (packaging materials), in those cases where, following packaging of the food within the container (=packaging material), the package must be subjected to retort treatment (sterilization treatment) with water vapor under pressurized conditions, this retort treatment can also be used to improve the performance of the gas barrier layer of the packaging material. In other words, by preparing a gas barrier laminate 10 or 20, using this laminate to form a food packaging container without conducting the specified water heat treatment, placing food inside the container, and then subjecting the container to about a 30 minute retort treatment (sterilization treatment) at 120° C., using water vapor under pressurized conditions, the gas barrier laminate 10 or 20 that constitutes the food packaging container undergoes water heat treatment, enabling the gas barrier property to be improved. In these cases, the treatment water is also referred to as "retort water".

In those cases where a gas barrier laminate is used as the type of food packaging material described above, the plastic substrate side of the laminate is preferably placed on the food side of the package (the inside), with the gas barrier layer side facing outward.

As described above, according to the present invention, by using a water-soluble polymer that contains no chlorine within its structure, a gas barrier laminate that exhibits a superior oxygen gas barrier property to conventional materials under high humidity conditions can be obtained using milder conditions than have conventionally been required. In other words, in the present invention, moisture, which has until now been considered one of the major causes of decreases in gas barrier properties, is actually utilized, and surprisingly enables a dramatic improvement in the gas barrier properties. Furthermore, by introducing, from externally, a metal compound of a bivalent or higher metal into the gas barrier layer, which is formed by heating a coating material composition comprising PVA (A) and EMA (B), the gas barrier properties can be improved even further.

EXAMPLES

As follows is a description of specifics of the present invention, based on a series of examples and comparative examples, although the present invention is in no way limited to these examples.

The oxygen permeability ($P_{film}$) of the gas barrier layers and the oxygen permeability ($P_{total}$) of the gas barrier laminates were determined in the following manner. Namely, each produced laminated film (=gas barrier laminate) was placed in an atmosphere at 25° C. and 80% RH, and a measurement was conducted using an OX-TRAN TWIN oxygen permeability tester, manufactured by Modern Control Inc., thus yielding a result for the oxygen permeability ($P_{total}$) at 25° C. and 80% RH. For the measurement, a mixture of oxygen gas and nitrogen gas (a carrier gas) that had been humidified to 25° C. and 80% RH was used. The oxygen permeability ($P_{PET}$) of the plastic substrate was also measured in the same manner. The oxygen permeability ($P_{film}$) of the gas barrier layer was calculated from the following formula.

$$1/P_{total} = 1/P_{film} + 1/P_{PET}$$

In this formula, $P_{total}$ (the measured value) represents the oxygen permeability of the laminated film (=the gas barrier laminate) comprising the film layer (=the gas barrier layer) formed from the gas barrier layer-forming coating material (C), and a PET film (=the plastic substrate). In those cases where the laminate contains a UC layer, $P_{total}$ represents the oxygen permeability of the laminated film comprising the film layer, the UC layer, and the plastic substrate.

$P_{film}$ (the calculated value) represents the oxygen permeability of the film layer formed from the coating material (C).

$P_{PET}$ (the measured value) represents the oxygen permeability of the plastic substrate (PET). In those cases where the laminate contains a UC layer, $P_{PET}$ represents the oxygen permeability of the UC layer and the plastic substrate.

Example 1

Comparative Example 1

To a solution of a polyester (Vylon 200, manufactured by Toyobo Co., Ltd. (Tg: 67° C.), Mn=17,000) dissolved in an ethyl acetate/MEK mixed solvent was added 5 parts by weight of magnesium oxide per 100 parts by weight of the polyester, and the resulting mixture was dispersed using a beads mill. To this solution was added sufficient quantity of a polyisocyanate (Sumijule 3300, manufactured by Sumitomo Chemical Co., Ltd) to generate a weight ratio between the polyester and the polyisocyanate of 60:40, thus yielding a mixed solution. To this mixed solution were added a 1% by weight MEK solution of dibutyltin laurylate, MEK, and ethyl acetate, thus yielding a primer composition (=a UC composition) with a solid fraction of approximately 14% by weight.

PVA (Poval 124, manufactured by Kuraray Co., Ltd., polyvinyl saponification degree: 98 to 99%, average polymerization degree: approximately 2,400) was dissolved in hot water, and then cooled to room temperature, thus forming a PVA aqueous solution. In a separate preparation, an aqueous solution of EMA (weight average molecular weight: 100,000) was also prepared.

The PVA aqueous solution and the EMA aqueous solution were mixed together in the PVA/EMA weight ratio shown in Table 1, thereby yielding a mixed solution (=gas barrier layer-forming coating material) with a solid fraction of 10% by weight.

The above UC composition was applied to a biaxially stretched polyester film (PET, thickness: 12 μm) using a No. 4 bar coater, and was then dried for 30 seconds at 80° C. in an electric oven, thus forming a film (=a UC layer) of thickness 0.5 μm. The above gas barrier layer-forming coating material was then applied to the thus formed UC layer using a No. 6 bar coater, dried for 2 minutes at 80° C. in an electric oven, and then subjected to further drying and heat treatment for 2 minutes at 200° C. in an electric oven, thus forming a film (=a gas barrier layer) of thickness 2 μm, and yielding a laminated film (=an untreated laminated film) (the comparative example 1).

The untreated laminated film obtained in the comparative example 1 was treated with hot water (120° C., 1.2 kgf/cm$^2$) for 30 minutes using an autoclave, thus yielding a laminated film (=a treated laminated film) (the example 1).

The oxygen permeability of each of the laminated films and film layers was measured.

Examples 2 to 4

Comparative Examples 2 to 4

Using the same method as that described above for the example 1 and the comparative example 1, gas barrier layer-forming coating materials with solid fractions of 10% by weight were prepared with the PVA/EMA weight ratios shown in Table 1, untreated laminated films (the comparative examples 2 to 4) and treated laminated films (the examples 2 to 4) were prepared, and the oxygen permeability values were measured.

Comparative Example 5

To a solution of the polyester (Vylon 200) dissolved in an ethyl acetate/MEK mixed solvent was added sufficient quantity of the polyisocyanate (Sumijule 3300) to generate a weight ratio between the polyester and the polyisocyanate of 60:40, thus yielding a mixed solution. To this mixed solution were added a 1% by weight MEK solution of dibutyltin laurylate, MEK, and ethyl acetate, thus yielding a primer composition (=a UC composition) with a solid fraction of approximately 14% by weight, but containing no magnesium oxide.

With the exception of using this UC composition, an untreated laminated film was prepared in the same manner as the comparative example 1, and the oxygen permeability was measured.

Example 5

With the exception of adjusting the PVA/EMA weight ratio to the value shown in Table 1, a gas barrier layer-forming coating material with a solid fraction of 10% by weight was prepared in the same manner as the example 1.

With the exceptions of using the UC composition from the comparative example 5, and using the above gas barrier layer-forming coating material, UC layer formation and gas barrier layer formation were conducted in the same manner as the example 1, thus yielding an (untreated) laminated film.

Subsequently, the thus obtained untreated laminated film was treated in an aqueous solution comprising 100 ppm of magnesium hydroxide (120° C., 1.2 kgf/cm$^2$) for 30 minutes using an autoclave, thus yielding a treated laminated film.

The oxygen permeability of the thus obtained laminated film and the film layer were measured.

Examples 6 to 15

Comparative Example 6

With the exception of altering the water heat treatment conditions for the untreated laminated film in the following manner:

treatment for 30 minutes in an aqueous solution comprising 100 ppm of magnesium carbonate (120° C., 1.2 kgf/cm$^2$) (the example 6);

treatment for 30 minutes in an aqueous solution comprising 100 ppm of calcium hydroxide (120° C., 1.2 kgf/cm$^2$) (the example 7);

treatment for 30 minutes in an aqueous solution comprising 100 ppm of calcium carbonate (120° C., 1.2 kgf/cm$^2$) (the example 8);

treatment for 30 minutes in an aqueous solution comprising 100 ppm of magnesium chloride (120° C., 1.2 kgf/cm$^2$) (the example 9);

treatment for 30 minutes in an aqueous solution comprising 30 ppm of magnesium hydroxide (120° C., 1.2 kgf/cm$^2$) (the example 10);

treatment for 30 minutes in an aqueous solution comprising 30 ppm of magnesium carbonate (120° C., 1.2 kgf/cm$^2$) (the example 11);

treatment for 30 minutes in an aqueous solution comprising 30 ppm of calcium hydroxide (120° C., 1.2 kgf/cm$^2$) (the example 12);

treatment for 30 minutes in an aqueous solution comprising 30 ppm of calcium carbonate (120° C., 1.2 kgf/cm$^2$) (the example 13);

treatment for 30 minutes in an aqueous solution comprising 30 ppm of chloride ions, 40 ppm of sulfate ions, 11.6 ppm of nitrate ions, 25.7 ppm of carbonate ions, 5.1 ppm of magnesium ions, 21 ppm of calcium ions, and 27 ppm of sodium ions (120° C., 1.2 kgf/cm$^2$) (the example 14);

treatment for 30 minutes in an aqueous solution comprising 3.8 ppm of chloride ions, 5.0 ppm of sulfate ions, 1.5 ppm of nitrate ions, 3.2 ppm of carbonate ions, 0.6 ppm of magnesium ions, 2.6 ppm of calcium ions, and 3.4 ppm of sodium ions (120° C., 1.2 kgf/cm$^2$) (the example 15); and treatment for 30 minutes in ion exchange water (120° C., 1.2 kgf/cm$^2$) (the comparative example 6);

treated laminated films were prepared in the same manner as the example 5, and the oxygen permeability of the thus obtained laminate films and film layers was measured.

The oxygen permeability values measured in each of the above examples and comparative examples are shown in Table 1. In Table 1:

(1) after water heat treatment/prior to water heat treatment=$P_{film}$ of the treated laminated film following water heat treatment/$P_{film}$ of the untreated laminated film prior to water heat treatment;

(2) after water heat treatment/prior to water heat treatment (%)=($P_{film}$ following water heat treatment/$P_{film}$ prior to water heat treatment)×100; and (3) water heat treatment rate of change (%)=(($P_{film}$ following water heat treatment−$P_{film}$ prior to water heat treatment)/$P_{film}$ prior to water heat treatment)×100; and in the case of the comparative example 1, the values of (1), (2), and (3) are the values calculated using 50 as the value for $P_{total}$; whereas the values of (1), (2), and (3) in the examples 5 through 15 and the comparative example 6 are the values calculated using the comparative example 5 as the untreated laminated film prior to water heat treatment.

TABLE 1

| | UC layer Metal compound/ polymer component (% | Gas barrier layer-forming coating material PVA/EMA weight ratio | Water heat treatment | | | | | (1) after water heat treatment/ prior to water heat treatment | (2) after water heat treatment/ prior to water heat treatment (%) | (3) water heat treatment rate of change (%) |
|---|---|---|---|---|---|---|---|---|---|---|
| | | | Metal compound/ content (ppm) | Temp. (° C.) | Time (min.) | P total cc/m$^2$· 24h · atm | P film | | | |
| Comp. example 1 | MgO | 10/90 | None | | | >50 | 100.00 | 1/20.4 | 4.93 | −95.07 |
| Example 1 | (5%) | | — | 120 | 30 | 4.70 | 4.93 | | | |
| Comp. example 2 | | 30/70 | None | | | 20.00 | 25.00 | 1/62.5 | 1.61 | −98.39 |
| Example 2 | | | — | 120 | 30 | 0.40 | 0.40 | | | |
| Comp. example 3 | | 40/60 | None | | | 15.40 | 18.20 | 1/26.0 | 3.87 | −96.13 |
| Example 3 | | | — | 120 | 30 | 0.70 | 0.70 | | | |
| Comp. example 4 | | 70/30 | None | | | 1.90 | 1.94 | 1/2.11 | 46.89 | −53.11 |
| Example 4 | | | — | 120 | 30 | 0.90 | 0.91 | | | |
| Comp. example 5 | — | 30/70 | None | | | 13.00 | 14.94 | | | |
| Example 5 | | | Mg(OH)$_2$/ 100 ppm | 120 | 30 | 0.35 | 0.35 | 1/42.7 | 2.35 | −97.65 |
| Example 6 | | | MgCO$_3$/ 100 ppm | 120 | 30 | 0.48 | 0.48 | 1/31.1 | 3.23 | −96.77 |
| Example 7 | | | Ca(OH)$_2$/ 100 ppm | 120 | 30 | 0.55 | 0.55 | 1/27.2 | 3.70 | −96.30 |

TABLE 1-continued

| | UC layer Metal compound/ polymer component (%) | Gas barrier layer-forming coating material PVA/EMA weight ratio | Water heat treatment | | | | | (1)after water heat treatment/ prior to water heat treatment | (2)after water heat treatment/ prior to water heat treatment (%) | (3)water heat treatment rate of change (%) |
|---|---|---|---|---|---|---|---|---|---|---|
| | | | Metal compound/ content (ppm) | Temp. (°C.) | Time (min.) | P total cc/m$^2$·24h·atm | P film | | | |
| Example 8 | | | CaCO$_3$/ 100 ppm | 120 | 30 | 0.51 | 0.51 | 1/29.3 | 3.43 | −96.57 |
| Example 9 | | | MgCl$_2$/ 30 ppm | 120 | 30 | 3.60 | 3.61 | 1/4.14 | 24.16 | −75.84 |
| Example 10 | | | Mg(OH)$_2$/ 30 ppm | 120 | 30 | 0.37 | 0.37 | 1/40.4 | 2.48 | −97.52 |
| Example 11 | | | MgCO$_3$/ 30 ppm | 120 | 30 | 0.49 | 0.49 | 1/30.5 | 3.28 | −96.72 |
| Example 12 | | | Ca(OH)$_2$/ 30 ppm | 120 | 30 | 0.57 | 0.57 | 1/26.2 | 3.82 | −96.18 |
| Example 13 | | | CaCO$_3$/ 30 ppm | 120 | 30 | 0.54 | 0.54 | 1/27.7 | 3.61 | −96.39 |
| Example 14 | | | see description | 120 | 30 | 0.29 | 0.29 | 1/51.5 | 1.94 | −98.06 |
| Example 15 | | | see description | 120 | 30 | 0.33 | 0.33 | 1/45.3 | 2.21 | −97.79 |
| Comp. example 6 | | | None | 120 | 30 | 20.00 | 25.00 | 1/0.6 | 7575.76 | +67.31 |

(Note) In all of the above examples and comparative examples, heat treatment of the coating material (C) was conducted for 2 minutes at 200° C., and the thickness of the obtained gas barrier layer was 2 μm.

This Application is based upon and claims the benefit of priority from prior Japanese Applications P2003-105897, filed on Apr. 9, 2003, and P2003-289705, filed on Aug. 8, 2003; the entire contents of which re incorporated by reference herein.

It is to be noted that, besides those already mentioned above, many modifications and variations of the above embodiments may be made without departing from the novel and advantageous features of the present invention. Accordingly, all such modifications and variations are intended to be included within the scope of the appended claims.

The invention claimed is:

1. A method of producing a gas barrier laminate, comprising: preparing a laminate comprising a plastic substrate, a gas barrier layer formed from a gas barrier layer-forming coating material comprising a polyvinyl alcohol and an ethylene-maleic acid copolymer, and a polymer layer comprising a metal compound of a bivalent or higher metal, wherein the polymer layer is laminated to at least one surface of the gas barrier layer; and heat treating the obtained laminate in the presence of water.

2. The method of producing a gas barrier laminate according to claim 1, wherein the polymer layer is an undercoat layer positioned between the plastic substrate and the gas barrier layer.

3. A method of producing a gas barrier laminate, comprising: applying a gas barrier layer-forming coating material comprising a polyvinyl alcohol and an ethylene-maleic acid copolymer, either directly onto a plastic substrate, or onto a plastic substrate with an undercoat layer disposed therebetween, and then conducting a heat treatment; and heat treating the obtained laminate in the presence of water comprising a metal compound of a bivalent or higher metal.

4. The method of producing a gas barrier laminate according to claim 2, wherein the undercoat layer is formed from a polyester polyol with a glass transition temperature of at least 0° C., and a polyisocyanate.

5. The method of producing a gas barrier laminate according to claim 1, wherein the metal compound is capable of reacting with hydroxyl groups or carboxyl groups.

6. The method of producing a gas barrier laminate according to claim 1, wherein the metal compound comprises one or more compounds selected from the group consisting of hydroxides, carbonates, acetates, and phosphates of bivalent or higher metals.

7. The method of producing a gas barrier laminate according to claim 6, wherein the metal compound comprises at least one hydroxide or carbonate of a bivalent or higher metal.

8. The method of producing a gas barrier laminate according to claim 1, wherein the bivalent or higher metal is Mg and/or Ca.

9. The method of producing a gas barrier laminate according to claim 1, wherein a weight ratio between the polyvinyl alcohol and the ethylene-maleic acid copolymer within the gas barrier layer-forming coating material falls within a range from 90:10 to 10:90.

10. The method of producing a gas barrier laminate according to claim 1, wherein the heat treatment conducted in the presence of water is conducted at 90° C. or higher.

* * * * *